May 14, 1946.    R. H. BUCK    2,400,285
WELDER'S ELECTRODE HOLDER
Filed Oct. 4, 1943
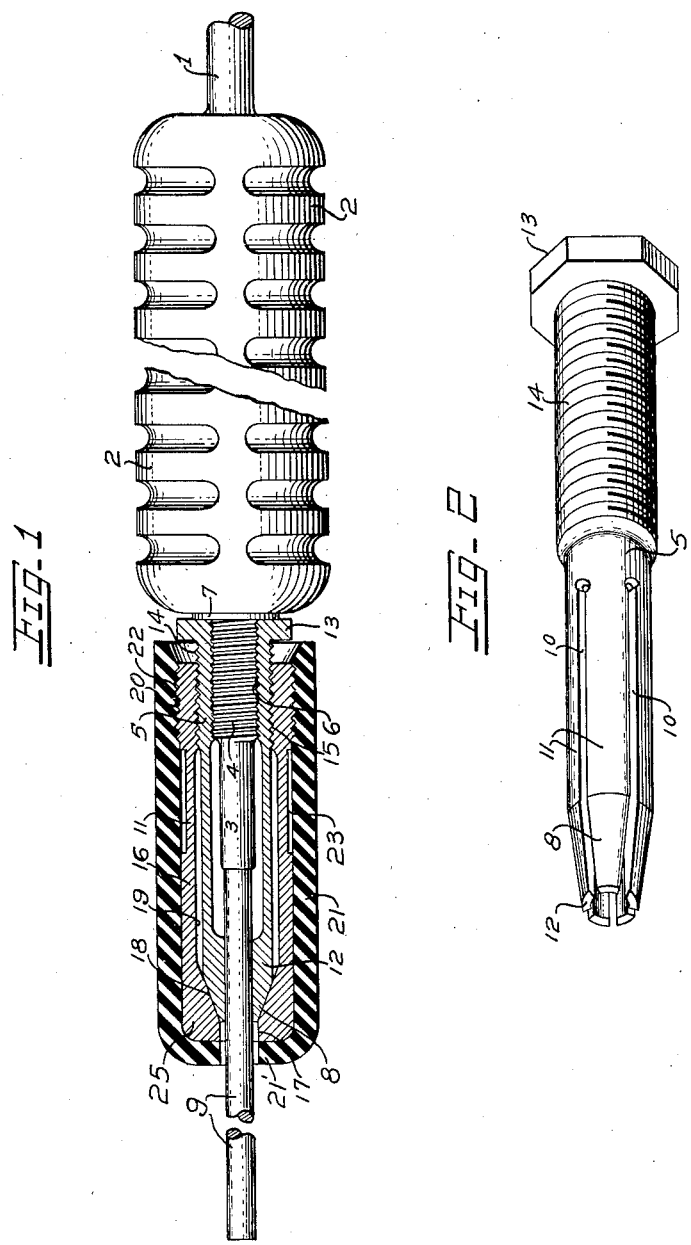
Inventor:
ROBERT H. BUCK
By
Attorney.

Patented May 14, 1946

2,400,285

UNITED STATES PATENT OFFICE 2,400,285

WELDER'S ELECTRODE HOLDER

Robert H. Buck, Oakland, Calif.

Application October 4, 1943, Serial No. 504,876

3 Claims. (Cl. 219—8)

This invention has to do with holders in which electric welding electrode rods are secured in manual electric welding, and the principal objects of the invention are to provide improvements in such holders which facilitate the replacement of welding rods, make a better electric contact, and provide a more effective insulation so that when the electrode is removed the holder may be laid down on any conducting surface, even upon the work itself without danger of making an electric contact. Other advantages of the construction are its ability to fit varying sizes of welding rods, and the ease with which the device may be completely taken apart or put together, or broken parts renewed.

In the drawing accompanying this application,

Fig. 1 is a substantially full size side view of a welding electrode holder embodying my improvements and with the rod gripping portion shown in longitudinal cross section to reveal all of the operating parts.

Fig. 2 is a perspective view of the split metal gripping jaw member shown detached.

Before describing the drawing in detail it may be said that most welding rod holders now available have a clamping lever projecting angularly from the holder which is objectionable, or they require the use of a wrench or other tools to clamp or release the rod, or are for other reasons objectionable, such as through lack of effective insulation, due to the design of the device, which subjects them to short circuiting if dropped on the metal surface or object (such as a ship) being worked on, even when the welding rod has been taken out, and it was to overcome these objections, as well as others, that the present construction was evolved.

In the drawing 1 is an insulated cable which forms one path for the welding current from the source of energy to the device, while 2 is a conventional handle or hand grip of insulating material into one end of which the cable passes and is secured, and from the opposite end of which handle extends a contact rod 3 which is enlarged and threaded as at 4 for about half its length and it extends into the handle 2. Rod 3 is rigidly secured into the handle 2 by any desired means such as by cement, vulcanizing, or otherwise, and electrically united within the handle to the wires of cable 1 in any desired manner not concerned with the present improvements as such a handle secured to an electric welding power cable and with the rigidly projecting contact rod as described is well known construction in the art.

My cooperating improved features comprise a tubular metal split jawed member 5 which is threaded internally at its rear portion as at 6 to screw over the threaded portion 4 of contact rod 3 and is provided with an integrally formed nut 13 at its inner end which may be forced up tight against the outer end of handle 2 or against a loose or integrally formed washer 7 on rod 3 by the use of a flat wrench to hold the tubular member 5 as a rigid extension of the contact rod 3.

The forward portion of tubular member 5 is tapered conically as at 8 and formed with a central bore or opening to receive a welding rod or electrode 9 which projects through the bore and comes into abutting contact with the outer end of contact rod 3 as shown in Fig. 1, and member 5 is radially slotted for about half its length from the outer end as indicated at 10 and is internally and exteriorly reduced in thickness along the central portion 11 so as to form a plurality of spring mounted gripping jaws 12 embracing the welding rod.

Tubular member 5 is also threaded externally along its rearward portion as at 14 to receive the internally threaded portion 15 of a sleeve member 16 which surrounds tubular member 5.

Sleeve member 16 is preferably of metal and formed with a short straight bore 17 at its forward end of a size equal to the largest diameter welding rod to be held, and rearwardly of the bore is then tapered outwardly as at 18 to fit over the tapered exterior of rod gripping jaws 12, but the sleeve is of an internal diameter 19 to be entirely free of tubular member 5 for the length of the thin slotted portions 11.

Sleeve 16 is preferably of hardened metal along its tapered seat 18, as is also the cooperating outer surface 8 of the jaws 12, and the sleeve is preferably rounded at its forward end as at 25 and provided at its rearward end with an outwardly projecting threaded portion 20, while wholly enclosing sleeve 16 is an insulating shell 21 formed to snugly embrace the sleeve and threaded at 22 to screw onto the sleeve threads 20, and project rearwardly somewhat beyond the sleeve to almost overlying relation to nut 13 when the parts are all screwed together. It should also be noted that the inner end of sleeve 16 is spaced from nut 13 when the parts are so screwed together with a normal or average size welding rod 9 gripped by jaws 12, so as to permit of screwing up further when smaller rods are used.

The insulating sleeve 21 may be made of any tough hard insulating material or compound such as hard rubber preferably reinforced, Bakelite and asbestos mixtures, or any other tough compound and is thick enough to resist fracture in event the tool is inadvertently dropped on an iron structure, or struck violently. The insulating sleeve fits nicely over the rounded outer end of metal sleeve 16 and extends entirely over the outer end as at 21' so that no metal is exposed when the welding rod 9 is taken out.

In use, to remove the rod from the gripped position shown in Fig. 1, the handle 2 is grasped firmly in one hand and the insulating sleeve 21 is unscrewed with the other, and if metal sleeve 16 also unscrews with it, the jaws 12 will be released and the welding rod may be removed and another one inserted, and the insulating sleeve screwed up tight again to carry with it sleeve 16 for tightening the gripping jaws.

However, if the insulating sleeve 21 unscrews from sleeve 16, the latter may be more forcibly gripped and turned, or a pair of pliers may be applied to it if very tight. This also holds good for tightening up the next rod before reapplying the insulating sleeve 21.

To prevent such a plier grip from marring the outer surface of sleeve 16, so that the outer insulating sleeve will not go on again properly, a reduced diameter or flattened area is provided on sleeve 16 as at 23 for pliers or wrench.

The insulating sleeve 21 may of course be cemented to sleeve 16 but this would prevent tightening up the tool grip with pliers or wrench, without danger of breaking the insulating sleeve, and likewise make it difficult to renew the insulating sleeve if broken accidently or badly burned from the arc when the rod is about used up.

While the welding rod 9 normally extends straight along the axis of the holder, and which is the most useful position, when it is desired to have it extend angularly from the holder it is a simple matter to bend the rod either before or after inserting it. In use of the tool, it is not necessary to release nut 13 unless it is desired to remove the entire gripping mechanism from handle 2.

Having thus described my improved welding electrode holder and the manner of its use, what I claim is:

1. In a welding rod holder having an insulated handle with a threaded contact rod projecting therefrom, a tubular metal member threaded internally at one end to screw onto said rod and provided at its opposite end with movable jaws arranged to clamp a welding electrode rod, a clamping sleeve screwed over said tubular member formed to cooperate with said movable jaws to compress the same upon the welding rod when the clamping sleeve is screwed up and to release the same upon unscrewing, and an outer sleeve of insulating material threaded and screwed over said clamping sleeve outwardly embracing and covering the outer side as well as the outer end of the same and provided with a central hole through which the welding rod projects when clamped in the jaws.

2. In a welding rod holder as set out in claim 1, said clamping sleeve provided intermediate its ends with a reduced diameter area adapted for gripping with pliers for turning the same.

3. In a welding electrode holder comprising an insulated handle at the end of an electric cable with a welding rod clamping device extending axially from the handle, an insulating sleeve entirely covering said clamping device as well as the outer end thereof and provided with a hole in its outer end to pass a welding rod, and a securing nut for fastening the device to said handle being accessible in just sufficient clearance provided between the outer end of said handle and the rearward end of said insulating sleeve to receive a thin flat wrench.

ROBERT H. BUCK.